(12) United States Patent
Lundman (10) Patent No.: US 8,936,045 B2
(45) Date of Patent: Jan. 20, 2015

(54) DUAL INFLATABLE PLUG ASSEMBLY

(71) Applicant: Philip L. Lundman, Fredonia, WI (US)

(72) Inventor: Philip L. Lundman, Fredonia, WI (US)

( * ) Notice: Subject to any disclaimer, the term of this patent is extended or adjusted under 35 U.S.C. 154(b) by 0 days.

(21) Appl. No.: 14/164,701

(22) Filed: Jan. 27, 2014

(65) Prior Publication Data

US 2014/0137971 A1   May 22, 2014

Related U.S. Application Data

(63) Continuation of application No. 13/489,806, filed on Jun. 6, 2012, now Pat. No. 8,636,035.

(60) Provisional application No. 61/526,128, filed on Aug. 22, 2011.

(51) Int. Cl.

| F16L 55/12 | (2006.01) |
| F16L 55/11 | (2006.01) |
| F16L 55/124 | (2006.01) |
| F16L 55/134 | (2006.01) |

(52) U.S. Cl.
CPC ........... *F16L 55/1141* (2013.01); *F16L 55/124* (2013.01); *F16L 55/134* (2013.01)
USPC .................................. 138/93; 138/89; 138/94

(58) Field of Classification Search
CPC ..... F16L 55/134; F16L 55/124; F16L 55/128; F16K 7/10
USPC ........................................ 138/93, 94, 89, 91
See application file for complete search history.

(56) References Cited

U.S. PATENT DOCUMENTS

| 3,842,864 | A | * | 10/1974 | Riegel et al. ..................... 138/93 |
| 4,026,329 | A | | 5/1977 | Thompson |
| 4,155,373 | A | * | 5/1979 | DiGiovanni ............... 137/15.15 |
| 5,439,032 | A | | 8/1995 | Petrone |
| 5,778,919 | A | | 7/1998 | Petrone |
| 5,934,311 | A | | 8/1999 | Brown |
| 5,996,621 | A | | 12/1999 | Hagiwara et al. |
| 6,318,192 | B1 | * | 11/2001 | Carbone .................... 73/863.81 |
| 6,446,669 | B1 | | 9/2002 | Lundman |
| 6,568,429 | B2 | | 5/2003 | Lundman |
| 6,959,734 | B2 | | 11/2005 | Lundman |
| 7,000,641 | B2 | | 2/2006 | Welfare |
| 7,455,077 | B2 | | 11/2008 | Lundman |
| 2002/0083989 | A1 | | 7/2002 | Lundman |
| 2004/0112451 | A1 | | 6/2004 | Lundman |

\* cited by examiner

*Primary Examiner* — Patrick F Brinson
(74) *Attorney, Agent, or Firm* — Michael Best & Friedrich LLP (57) ABSTRACT

An inflatable plug assembly includes a first inflatable plug, a second inflatable plug, and a first mount coupled to the first inflatable plug. The first mount is configured to deliver fluid to and inflate the first inflatable plug. The inflatable plug assembly also includes a second mount coupled to the second inflatable plug. The second mount is configured to deliver fluid to and inflate the second inflatable plug. The second mount is secured to the first mount. The first inflatable plug and the second inflatable plug are independently inflatable.

18 Claims, 6 Drawing Sheets

DUAL INFLATABLE PLUG ASSEMBLY

CROSS-REFERENCE TO RELATED APPLICATIONS

This application is a continuation of U.S. patent application Ser. No. 13/489,806, filed Jun. 6, 2012, which claims priority to U.S. Provisional Patent Application No. 61/526,128, filed Aug. 22, 2011, the entire contents of both of which are incorporated by reference herein.

BACKGROUND OF THE INVENTION

The present invention relates to a pipe sealing apparatus that is insertable into pipelines of varying diameters and is inflatable therein to seal a section of pipeline. Such a pipe sealing apparatus is referred to as an inflatable plug assembly.

Inflatable plugs provide a useful means to mitigate the uncontrolled release of fluids from a pipeline when a break occurs in the pipeline. Inflatable plugs can also be used to isolate sections of a pipeline when performing repair or maintenance work on the pipeline.

SUMMARY

Embodiments of the invention provide an assembly including two or more inflatable plugs that are insertable into a pipe through a single hot tap. In some embodiments, the inflatable plugs may be inserted through the hot tap simultaneously. Additionally or alternatively, the plugs may be independently inflatable and deflatable.

In one embodiment, the invention provides an inflatable plug assembly including a first inflatable plug, a second inflatable plug, and a first mount coupled to the first inflatable plug. The first mount is configured to deliver fluid to and inflate the first inflatable plug. The inflatable plug assembly also includes a second mount coupled to the second inflatable plug. The second mount is configured to deliver fluid to and inflate the second inflatable plug. The second mount is secured to the first mount. The first inflatable plug and the second inflatable plug are independently inflatable.

In another embodiment, the invention provides an inflatable plug assembly including a first inflatable plug, a second inflatable plug, a centering guide having an outer surface that defines a periphery, and a first mount coupled to the centering guide and to the first inflatable plug. The first mount is configured to deliver fluid to and inflate the first inflatable plug. The inflatable plug assembly also includes a second mount coupled to the centering guide and to the second inflatable plug. The second mount is configured to deliver fluid to and inflate the second inflatable plug. The first inflatable plug and the second inflatable plug generally fit within the periphery defined by the centering guide when deflated.

In yet another embodiment, the invention provides a system for plugging a pipe. The system includes an inflation supply, a hot tap sleeve configured to couple to the pipe to allow access into the pipe, an inflation ram insertable through the hot tap sleeve toward the pipe, and an inflatable plug assembly coupled to the inflation ram. The inflatable plug assembly includes a first inflatable plug, a second inflatable plug, and a centering guide coupled to an end of the inflation ram. The centering guide has an outer surface that defines a periphery. The inflatable plug assembly also includes a first mount coupled to the centering guide and to the first inflatable plug. The first mount defines a first flow path between the inflation supply and the first inflatable plug to deliver fluid to and inflate the first inflatable plug. The inflatable plug assembly further includes a second mount coupled to the centering guide and to the second inflatable plug. The second mount defines a second flow path between the inflation supply and the second inflatable plug to deliver fluid to and inflate the second inflatable plug. The first flow path is discrete from the second flow path such that the first inflatable plug and the second inflatable plug are independently inflatable. The first inflatable plug and the second inflatable plug generally fit within the periphery defined by the centering guide when deflated.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
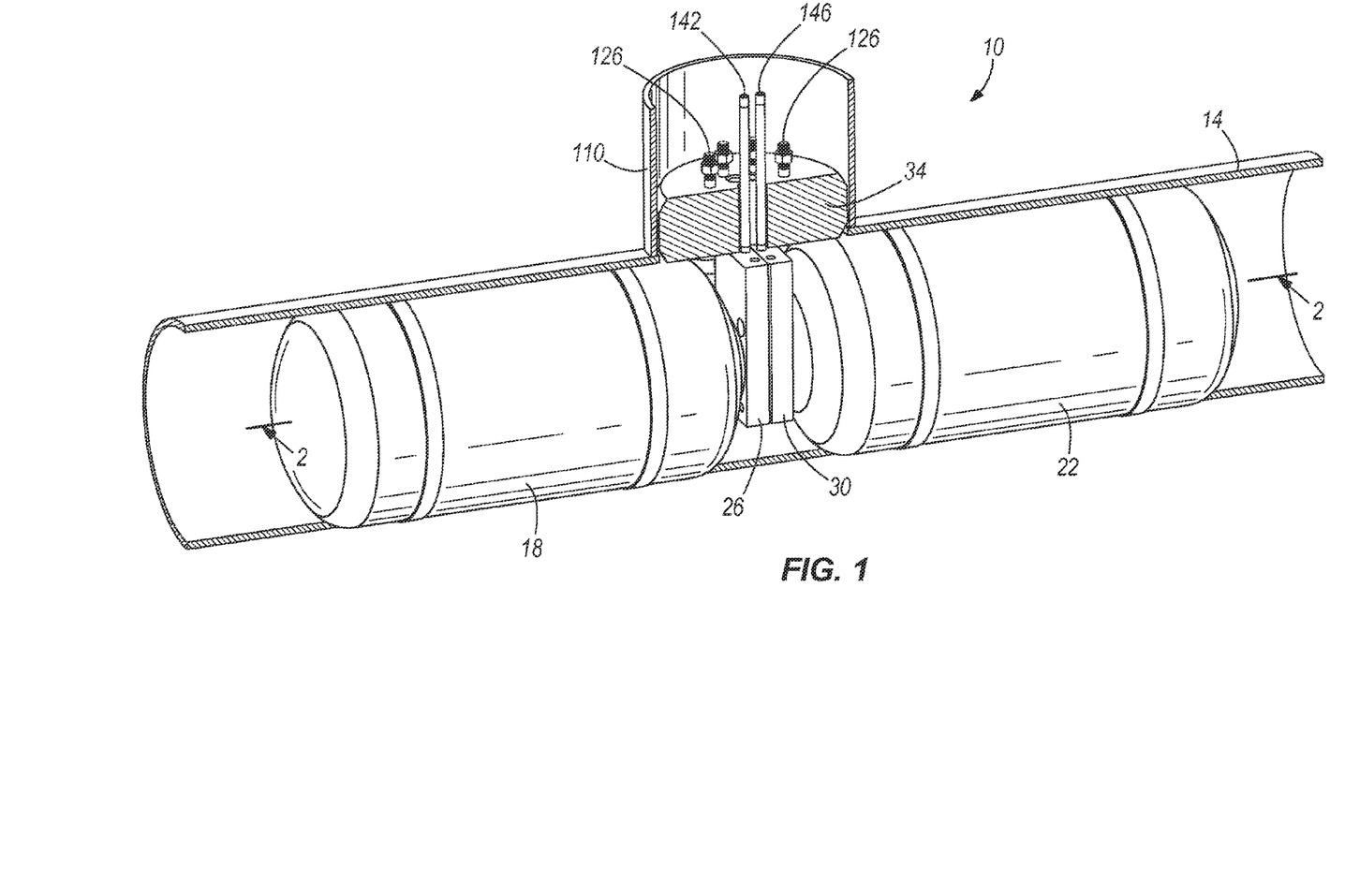
FIG. 1 is a perspective partial sectional view of a dual plug assembly embodying the invention, the dual plug assembly being in an inflated state.
Figure 2:
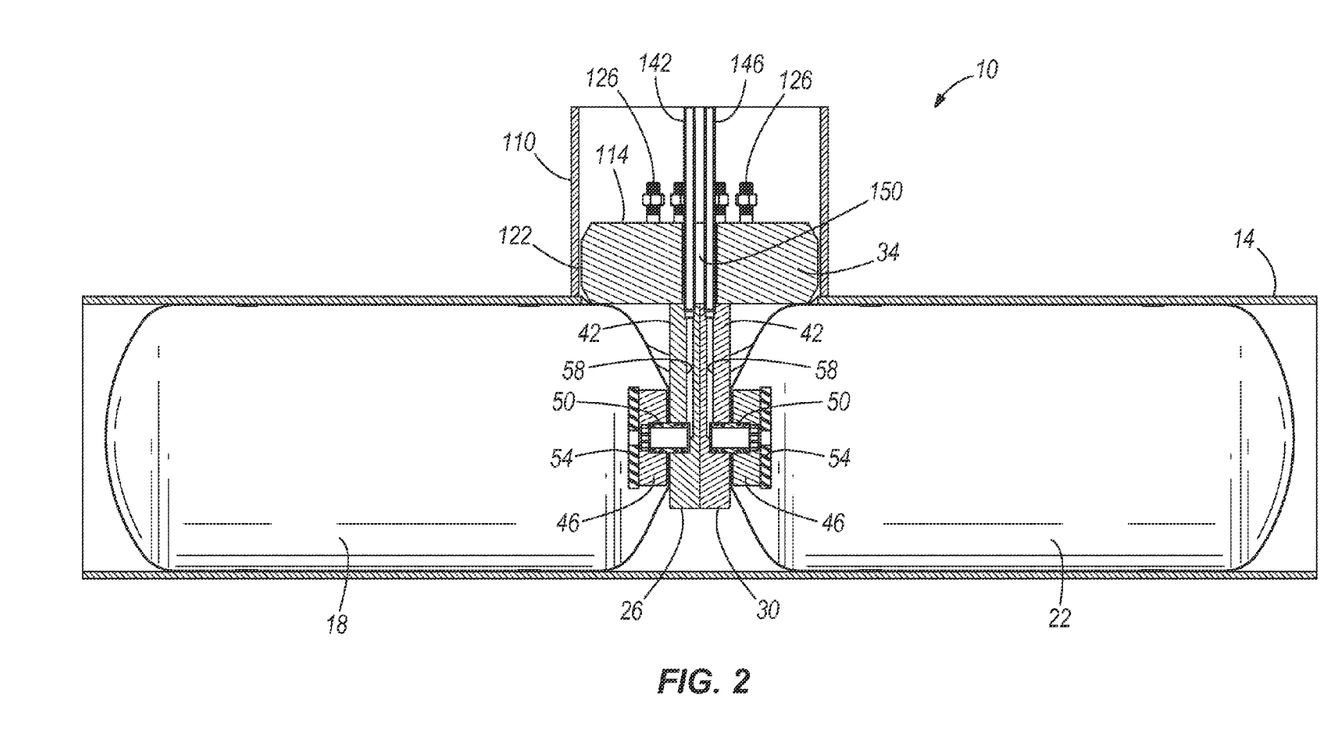
FIG. 2 is a cross-sectional view of the dual plug assembly.

FIGS. 1 and 2 illustrate a dual inflatable plug assembly 10 within a pipe 14. The pipe 14 may be, for example, a sewer line, a water main, an oil pipeline, a gas line, or any other conduit suitable for transporting fluids. The assembly 10 is insertable into the pipe 14 through a hot tap to restrict fluid and/or gas flow through the pipe 14. Restricting fluid flow through the pipe 14 permits maintenance and/or repairs to be performed on the pipe 14 or other related structures.

In the illustrated embodiment, the plug assembly 10 includes a first inflatable plug 18, a second inflatable plug 22, a first mount 26, a second mount 30, and a centering guide 34. The plugs 18, 22 may be filled with a fluid (e.g., air, nitrogen, water, inert gas, etc.) to inflate the plugs 18, 22. When inflated, the plugs 18, 22 substantially block fluid flow through the pipe 14. In some embodiments, the plugs 18, 22 may be constructed in a similar manner to the plugs disclosed in U.S. Pat. No. 7,455,077, issued Nov. 25, 2008, the entire contents of which are incorporated by reference herein. The length, diameter, and shape of the plugs 18, 22 may be varied depending on the shape and size of the pipe 14.

The first mount 26 and the second mount 30 are coupled to the first plug 18 and the second plug 22, respectively. In the illustrated embodiment, the mounts 26, 30 are coupled to ends of the plugs 18, 22. In other embodiments, the mounts 26, 30 may be coupled elsewhere on the plugs 18, 22, such as on sides of the plugs 18, 22. The mounts 26, 30 communicate with an inflation supply 38 (FIG. 6) to deliver fluid to and inflate the plugs 18, 22.

Figure 3:
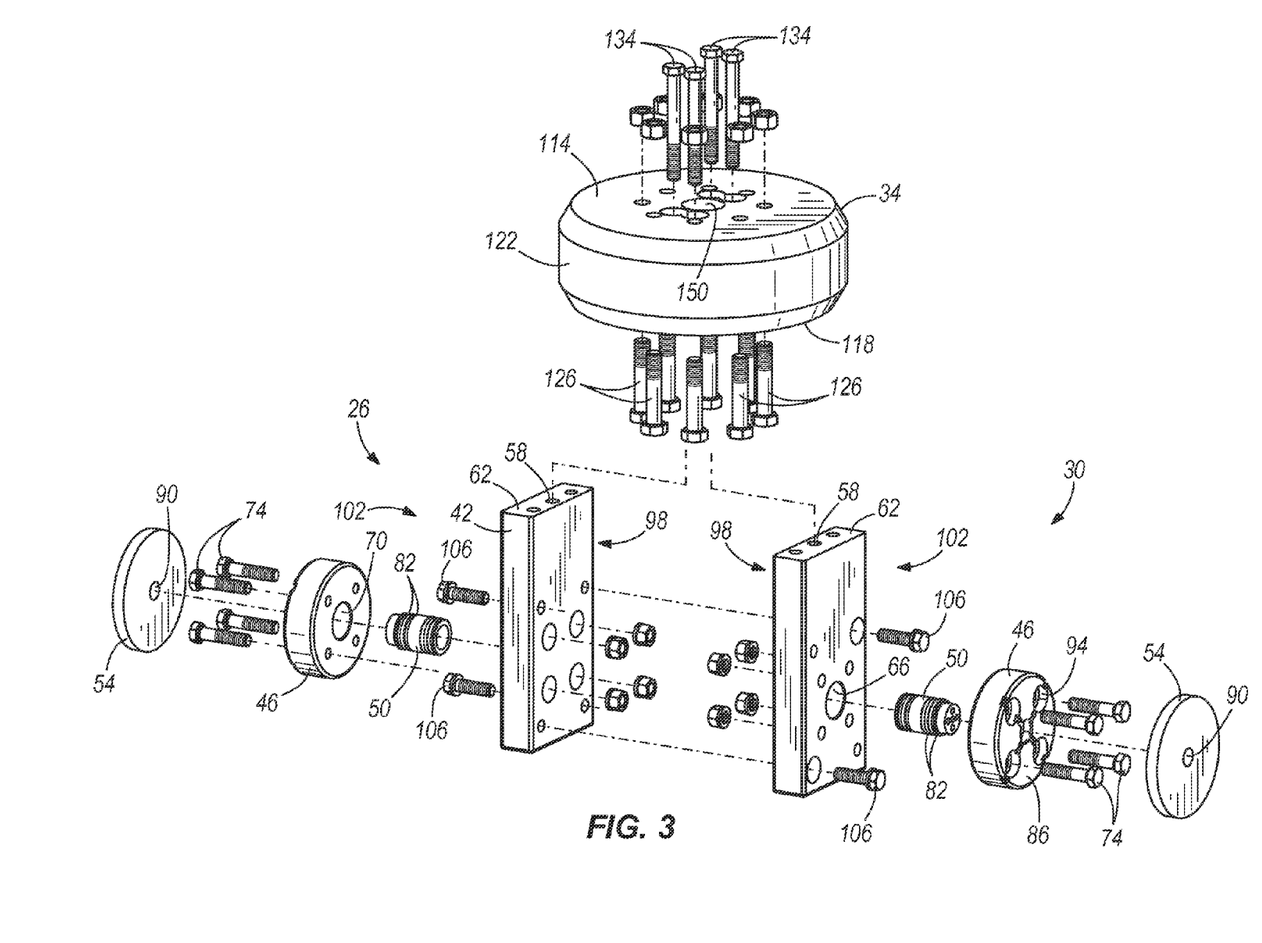
FIG. 3 is an exploded perspective view of a portion of the dual plug assembly.
Figure 4:
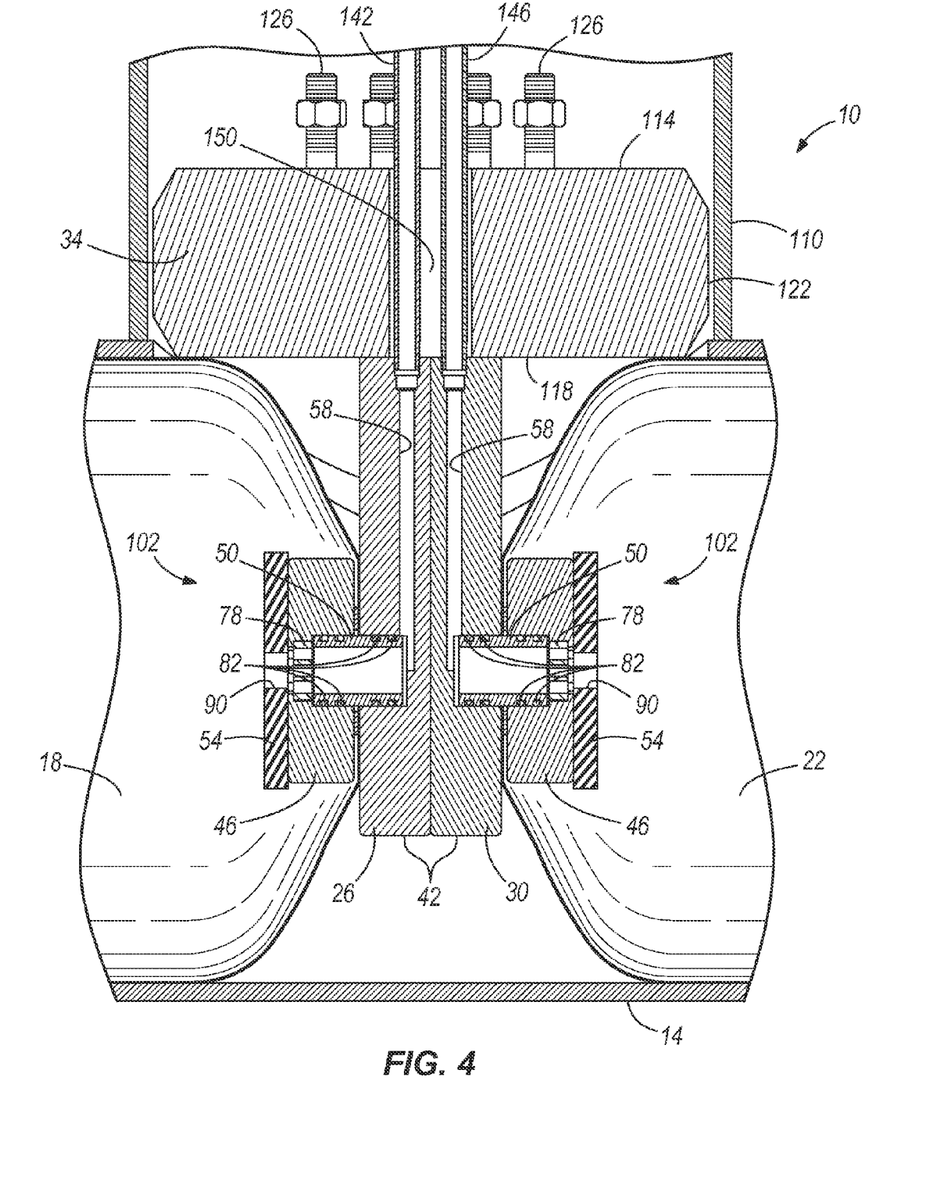
FIG. 4 is an enlarged cross-sectional view of a portion of the dual plug assembly.

As shown in FIGS. 3 and 4, the first and second mounts 26, 30 are generally identical, and like parts of each mount 26, 30 have been given the same reference numbers. Each of the illustrated mounts 26, 30 includes a first or outer flange plate 42, a second or inner flange plate 46, a spool 50, and a pad 54. The first flange plate 42 is positioned outside of the corresponding plug 18, 22. A conduit 58 is formed in the first plate 42 and extends from an upper surface 62 of the plate 42 to a cavity 66 within the plate 42. The second flange plate 46 is positioned substantially within the corresponding plug 18, 22. The second plate 46 defines a cavity 70 that is generally aligned with the cavity 66 in the first plate 42. In the illustrated embodiment, the plates 42, 46 are connected together with bolts 74, although other suitable fasteners may also or alternatively be employed. A portion of the plug 18, 22 is captured between the first and second flange plates 42, 46 of the corresponding mount 26, 30 to the secure the mount 26, 30 to the plug 18, 22.

The spool 50 of each mount 26, 30 extends between and is received within the cavity 66 in the first plate 42 and the cavity 70 in the second plate 46. The spool 50 helps direct fluid flow between the plates 42, 46. A grate 78 (FIG. 4) is positioned in the cavity 70 of the second plate 46 adjacent the spool 50. The grate 78 has smaller diameter openings than the spool 50 to help meter fluid flow through the spool 50. In the illustrated embodiment, elastomeric seals 82, such as O-rings, surround portions of the spool 50 between the first plate 42 and the second plate 46 to inhibit fluid leakage. In other embodiments, other suitable sealing members may also or alternatively be employed. In some embodiments, the spool 50 may be integrally formed as a single piece with or permanently fixed to the first flange plate 42 or the second flange plate 46.

The pad 54 of each mount 26, 30 is coupled to an inwardly-facing surface 86 of the second flange plate 46 and is positioned substantially within the corresponding inflatable plug 18, 22. In the illustrated embodiment, the pad 54 is secured to the second plate 46 by an adhesive, such as LOCTITE 499 adhesive, although other suitable fasteners may also or alternatively be employed. The pad 54 defines an aperture 90 that is generally aligned with the spool 50 and the grate 78. The inwardly-facing surface 86 of the second plate 46 also defines grooves 94 that extend radially from the grate 78 to an edge of the plate 46. The aperture 90 in the pad 54 and the grooves 94 in the plate 46 allow fluid flow between the mount 26, 30 and the corresponding plug 18, 22. In the illustrated embodiment, the pad 54 is made of an elastomeric material, such as rubber. In other embodiments, the pad 54 may be formed of other suitable materials.

As shown in FIGS. 2 and 4, the first and second mounts 26, 30 are secured together such that the mounts 26, 30, and thereby the plugs 18, 22, can be moved together simultaneously into and out of the pipe 14 as a single assembly. In particular, the first and second mounts 26, 30 are arranged in a back-to-back orientation such that a first side 98 of one mount 26 faces the first side 98 of the other mount 30. A second side 102 of each mount 26, 30 (i.e., the side of the mount 26, 30 to which the corresponding plug 18, 22 is coupled) faces away from the other mount 26, 30 such that plugs 18, 22 expand in generally opposite directions when inflated. In the illustrated embodiment, the mounts 26, 30 are directly secured together by bolts 106 (FIG. 3). In some embodiments, the mounts 26, 30 may be indirectly secured together through the centering guide 34. In further embodiments, the first and second mounts 26, 30 may be integrally formed as a single mount that couples to both the first plug 18 and the second plug 22.

As shown in FIGS. 1-3, the centering guide 34 is coupled to the upper surfaces 62 of the first mount 26 and the second mount 30. The guide 34 is shaped and sized to fit within a hot tap sleeve 110 so that the guide 34 centers the assembly 10 within the hot tap in the pipe 14. In the illustrated embodiment, the centering guide 34 is generally cylindrical, although other suitable shapes may alternatively be employed.

Figure 5:
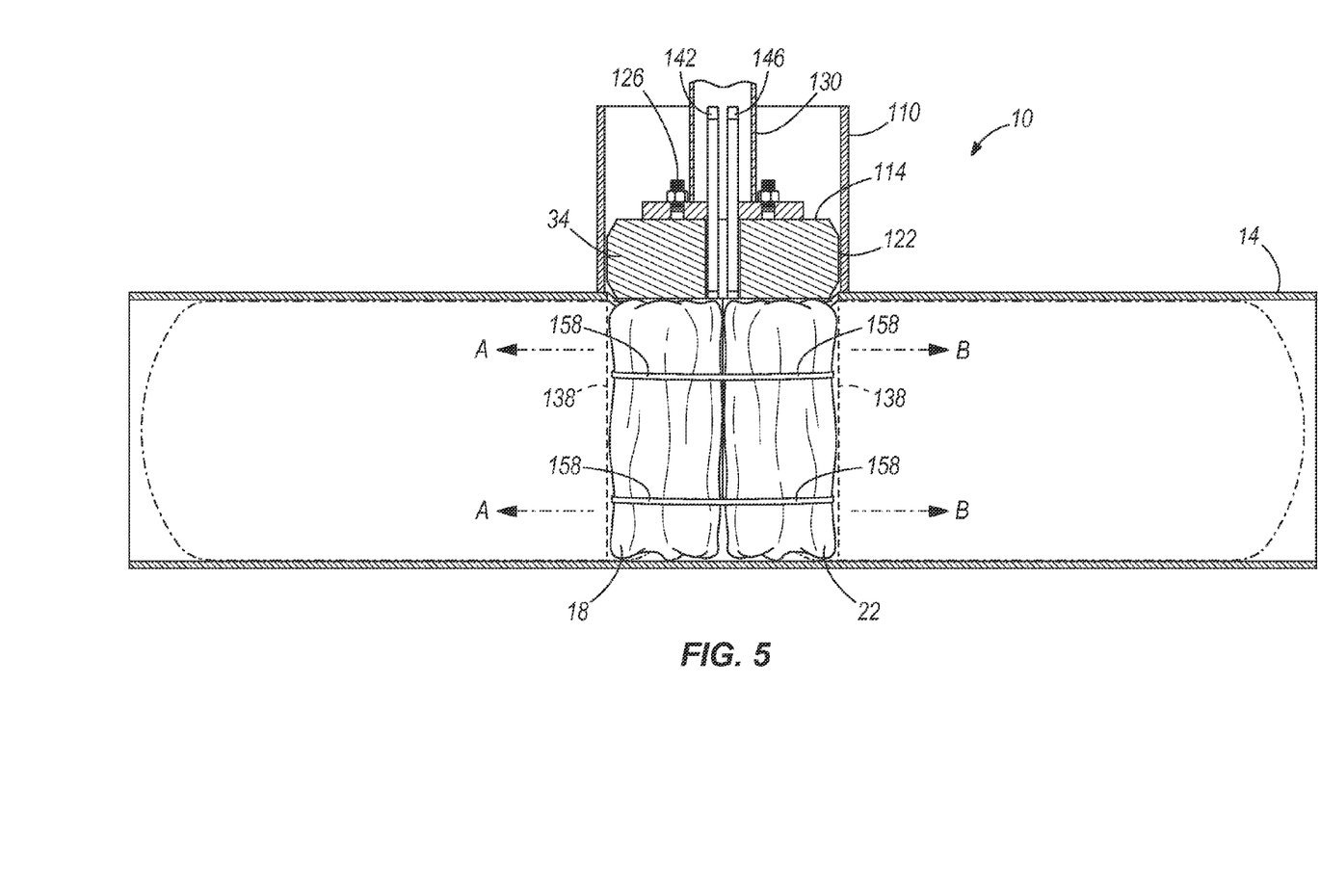
FIG. 5 is a partial sectional view of the dual plug assembly in a deflated state.
Figure 6:
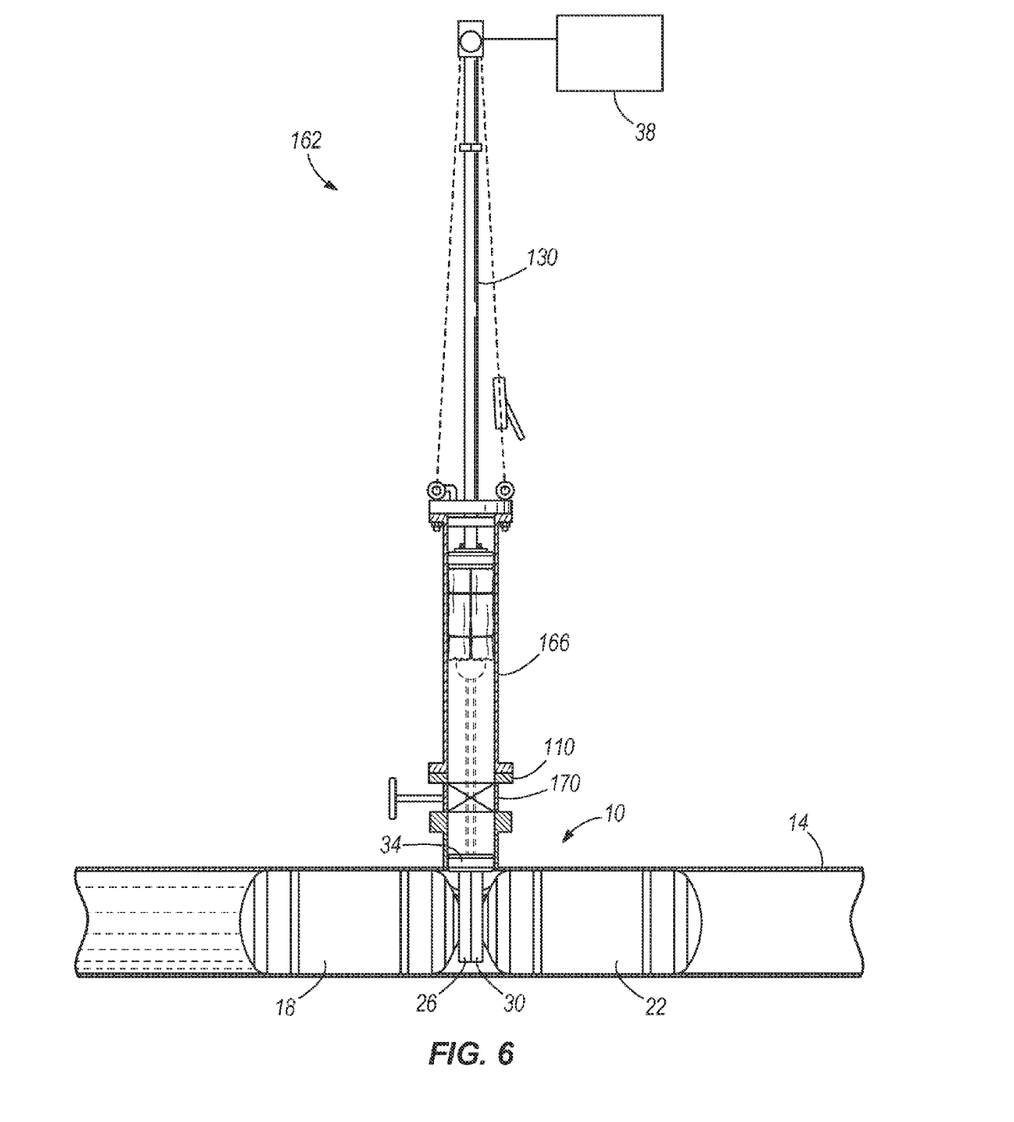
FIG. 6 illustrates a system including the dual plug assembly.

The centering guide 34 includes an upper surface 114, a lower surface 118, and an outer perimeter surface 122 that is generally perpendicular to the upper and lower surfaces 114, 118. A plurality of bolts 126 extends from the upper surface 114 of the guide 34. The bolts 126 are configured to secure the guide 34 to an inflation ram 130 (FIG. 6). In the illustrated embodiment, the first and second mounts 26, 30 are also secured to the lower surface 118 of the guide 34 with bolts 134 (FIG. 3), although other suitable fasteners may also or alternatively be employed. The outer surface 122 defines a periphery of the guide 34. The periphery is the outermost edge of the centering guide 34 that defines a footprint 138 (FIG. 5) of the guide 34. When the plugs 18, 22 are deflated, as shown in FIG. 5, the plugs 18, 22 and the mounts 26, 30 generally fit within the periphery of the guide 34. Such an arrangement allows the entire plug assembly 10 to be inserted into the pipe 14 through the hot tap sleeve 110 as a single assembly.

Referring back to FIGS. 2 and 4, the centering guide 34 also includes two conduits 142, 146 extending outwardly from the upper surface 114 of the guide 34. The first conduit 142, or pipe nipple, is positioned within a bore 150 in the guide 34 and communicates with the conduit 58 formed in the first mount 26. The second conduit 146, or pipe nipple, is also positioned within the bore 150 in the guide 34 and communicates with the conduit 58 formed in the second mount 30. The first and second conduits 142, 146 are configured to couple to the inflation supply 38 (FIG. 6) through the inflation ram 130 to deliver fluid from the supply 38 to the mounts 26, 30 and, thereby, the plugs 18, 22.

The first and second mounts 26, 30 define two discrete flow paths such that the first and second plugs 18, 22 may be independently inflated and deflated. The first flow path extends from the inflation supply 38, through the first conduit 142 in the guide 34, through the conduit 58 in the first plate 42 of the first mount 26, through the spool 50 of the first mount 26, through the grooves 94 in the second plate 46 and the aperture 90 in the pad 54 of the first mount 26, and into the first inflatable plug 18. The second flow path extends from the inflation supply 38, through the second conduit 146 in the guide 34, through the conduit 58 in the first plate 42 of the second mount 30, through the spool 50 of the second mount 30, through the grooves 94 in the second plate 46 and the aperture 90 in the pad 54 of the second mount 30, and into the second inflatable plug 22.

FIG. 5 illustrates the first plug 18 and the second plug 22 in a deflated state. In this state, the plugs 18, 22 are held in place by rubber bands 158 or other appropriate straps. In some embodiments, the rubber bands 158 may be omitted. Since the deflated plugs 18, 22 have an outer dimension that is generally equal to or less than the footprint 138 of the centering guide 34, the plugs 18, 22 are insertable into the pipe 14 simultaneously through the hot tap sleeve 110. Once positioned inside the pipe 14, the plugs 18, 22 may be inflated with fluid from the inflation supply 38 (FIG. 6) through the mounts 26, 30. As the plugs 18, 22 are inflated, the plugs 18, 22 break the bands 158 and expand outwardly away from the mounts 26, 30. In some embodiments, the bands 158 may be designed to roll up and/or off of the plugs 18, 22 rather than break. During inflation, the first plug 18 expands outwardly in direction A, while the second plug 22 expands outwardly in direction B. The inflated plugs 18, 22, as shown in FIGS. 1 and 2, thereby substantially block the pipe 14 to restrict fluid flow through the pipe 14.

In some embodiments, the first and second plugs 18, 22 may similarly be deflated through the mounts 26, 30 and the conduits 142, 146 in the centering guide 34 using a pump or other suitable device. Once the plugs 18, 22 are deflated, the plug assembly 10 may be pulled out of the pipe 14 through the hot tap sleeve 110.

FIG. 6 illustrates a system 162 for inserting, inflating, and deflating the plugs 18, 22 of the plug assembly 10. The system 162 generally includes the hot tap sleeve 110, a launch cylinder 166, the inflation ram 130, and the inflation supply 38. The hot tap sleeve 110 is coupled (e.g., welded) to the pipe 14 at the hot tap. A tapping valve 170 is coupled to the sleeve 110 to allow selective access into the pipe 14 through the hot tap. The launch cylinder 166 is coupled to the hot tap sleeve 110 to help guide and direct the plug assembly 10 into the pipe 14. The inflation ram 130 is insertable through the launch cylinder 166 and the hot tap sleeve 110 to push the plug assembly 10 into and pull the plug assembly 10 out of the pipe 14. As discussed above, the inflation ram 130 is bolted to the centering guide 34 of the assembly 10 and fluidly connects the mounts 26, 30 to the inflation supply 38. The inflation supply 38 may be a pump or compressor suitable for delivering fluid to the plug assembly 10.

The dual inflatable plug assembly 10 discussed above allows multiple plugs to be inserted and installed in a pipe through a single hot tap, yet still be inflated independently of one another. Using the assembly 10 provides redundancy by plugging the pipe with two plugs, without requiring two hot taps and two separate plug insertion systems. In addition, the assembly 10 allows the single hot tap to be used as a monitoring port to test for or detect any leakage past the plugs. The hot tap can be used to bleed off any gas or fluid (which may be flammable or noxious) that builds up pressure between the plugs before the fluid potentially seeps past the downstream plug. Furthermore, the assembly 10 allows an inert purge gas to be introduced between the plugs. This gas can be introduced at a pressure that is higher than the pressure in the pipe to inhibit seepage of any gas or fluid from the pipe. The inert gas could be introduced to prevent, for example, flammable gas from flowing into a downstream welding area or a noxious gas from flowing into a downstream work area.

In the past, at least three separate hot taps were required to insert two plugs and allow for bleeding off or purging between the plugs. The dual plug assembly 10 thereby provides a significant advantage for contractors or other users because only a single hot tap is required for redundancy, a double block and bleed system, and/or a double block and purge system.

Various features and advantages of the invention are set forth in the following claims.

The invention claimed is:

1. An inflatable plug assembly for plugging a pipe, the inflatable plug assembly comprising:
    a first inflatable plug;
    a second inflatable plug;
    a first mount coupled to the first inflatable plug, the first mount configured to direct fluid to and inflate the first inflatable plug; and
    a second mount coupled to the second inflatable plug, the second mount configured to direct fluid to and inflate the second inflatable plug;
    wherein the first mount and the second mount are insertable into the pipe with the first inflatable plug and the second inflatable plug so that the first and second mounts are received within an inner periphery of the pipe;
    wherein the first inflatable plug, the second inflatable plug, the first mount, and the second mount are insertable into the pipe as a single unit.

2. The inflatable plug assembly of claim 1, wherein the first mount and the second mount are secured together.

3. The inflatable plug assembly of claim 2, wherein the first mount and the second mount are bolted together.

4. An inflatable plug assembly for plugging a pipe, the inflatable plug assembly comprising:
    a first inflatable plug;
    a second inflatable plug;
    a first mount coupled to the first inflatable plug, the first mount configured to direct fluid to and inflate the first inflatable plug; and
    a second mount coupled to the second inflatable plug, the second mount configured to direct fluid to and inflate the second inflatable plug;
    wherein the first mount and the second mount are insertable into the pipe with the first inflatable plug and the second inflatable plug so that the first and second mounts are received within an inner periphery of the pipe;
    wherein each mount includes a first flange plate and a second flange plate, wherein the first flange plate is positioned outside of the corresponding inflatable plug, and wherein the second flange plate is positioned substantially within the corresponding inflatable plug.

5. The inflatable plug assembly of claim 4, wherein a portion of each inflatable plug is captured between the corresponding first and second flange plates.

6. The inflatable plug assembly of claim 1, wherein the first inflatable plug and the second inflatable plug are independently inflatable.

7. The inflatable plug assembly of claim 6, wherein the first mount defines a first flow path to direct fluid to the first inflatable plug, wherein the second mount defines a second flow path to direct fluid to the second inflatable plug, and wherein the first flow path is discrete from the second flow path.

8. An inflatable plug assembly for plugging a pipe, the inflatable plug assembly comprising:
    a first inflatable plug;
    a second inflatable plug;
    a first mount coupled to the first inflatable plug, the first mount configured to direct fluid to and inflate the first inflatable plug; and
    a second mount coupled to the second inflatable plug, the second mount configured to direct fluid to and inflate the second inflatable plug;
    wherein the first mount and the second mount are insertable into the pipe with the first inflatable plug and the second inflatable plug so that the first and second mounts are received within an inner periphery of the pipe;
    wherein each mount includes a first side and a second side, wherein the first sides of the first and second mounts face each other, and wherein the first inflatable plug is coupled to the second side of the first mount and the second inflatable plug is coupled to the second side of the second mount.

9. A system for plugging a pipe, the system comprising:
    an inflatable plug assembly including a first inflatable plug,
a second inflatable plug,
a first mount coupled to the first inflatable plug, the first mount configured to direct fluid to and inflate the first inflatable plug, and
a second mount coupled to the second inflatable plug, the second mount configured to direct fluid to and inflate the second inflatable plug; and
an inflation ram coupled to the first mount and the second mount, the inflation ram operable to push the inflatable plug assembly into the pipe as a single unit.

10. The system of claim 9, wherein the inflatable plug assembly further includes a centering guide having a first surface and a second surface opposite the first surface, wherein the inflation ram is coupled to the first surface of the centering guide, and wherein the first and second mounts are coupled to the second surface of the centering guide.

11. The system of claim 10, wherein the centering guide has an outer surface extending generally perpendicularly between the first and second surfaces, wherein the outer surface defines a periphery of the centering guide, and wherein the first and second inflatable plugs generally fit within the periphery of the centering guide when deflated.

12. The system of claim 9, further comprising a hot tap sleeve configured to couple to the pipe to allow access into the pipe, wherein the inflation ram is insertable through the hot tap sleeve to push the inflatable plug assembly into the pipe.

13. The system of claim 9, wherein the first mount defines a first flow path to direct fluid to the first inflatable plug, wherein the second mount defines a second flow path to direct fluid to the second inflatable plug, and wherein the first flow path is discrete from the second flow path.

14. An inflatable plug assembly for plugging a pipe, the pipe having a hot tap sleeve extending therefrom, the inflatable plug assembly comprising:
an inflatable plug;
a mount coupled to the inflatable plug, the mount configured to direct fluid to and inflate the inflatable plug; and
a centering guide coupled to the mount and configured to be positioned within the hot tap sleeve, the centering guide movable within the hot tap sleeve to direct the inflatable plug through the hot tap sleeve and into the pipe;
wherein the mount is bolted to the centering guide.

15. The inflatable plug assembly of claim 14, wherein the centering guide has an outer surface that defines a periphery of the centering guide, wherein the mount is positioned within the periphery of the centering guide, and wherein the inflatable plug generally fits within the periphery of the centering guide when deflated.

16. An inflatable plug assembly for plugging a pipe, the pipe having a hot tap sleeve extending therefrom, the inflatable plug assembly comprising:
a first inflatable plug;
a first mount coupled to the first inflatable plug, the first mount configured to direct fluid to and inflate the first inflatable plug;
a centering guide coupled to the first mount and configured to be positioned within the hot tap sleeve, the centering guide movable within the hot tap sleeve to direct the first inflatable plug through the hot tap sleeve and into the pipe;
a second inflatable plug; and
a second mount coupled to the second inflatable plug, the second mount configured to direct fluid to and inflate the second inflatable plug;
wherein the centering guide is coupled to the second mount to direct the second inflatable plug through the hot tap sleeve and into the pipe.

17. An inflatable plug assembly for plugging a pipe, the pipe having a hot tap sleeve extending therefrom, the inflatable plug assembly comprising:
an inflatable plug;
a mount coupled to the inflatable plug, the mount configured to direct fluid to and inflate the inflatable plug; and
a centering guide coupled to the mount and configured to be positioned within the hot tap sleeve, the centering guide movable within the hot tap sleeve to direct the inflatable plug through the hot tap sleeve and into the pipe;
wherein the centering guide includes a plurality of bolts, and wherein the plurality of bolts is configured to secure the centering guide to an inflation ram.

18. The inflatable plug assembly of claim 14, wherein the centering guide includes a conduit, and wherein the conduit communicates with the mount to deliver fluid to the mount.

* * * * *